(12) United States Patent
Lukito

(10) Patent No.: US 12,006,964 B2
(45) Date of Patent: Jun. 11, 2024

(54) PANELS FOR WALLS, DOORS AND STORAGE CONTAINERS

(71) Applicant: Harsoyo Lukito, Orange, CA (US)

(72) Inventor: Harsoyo Lukito, Orange, CA (US)

( * ) Notice: Subject to any disclaimer, the term of this patent is extended or adjusted under 35 U.S.C. 154(b) by 547 days.

(21) Appl. No.: 17/204,501

(22) Filed: Mar. 17, 2021

(65) Prior Publication Data

US 2022/0299050 A1 Sep. 22, 2022

(51) Int. Cl.
*F16B 5/00* (2006.01)
*B65D 21/08* (2006.01)
*E05D 1/06* (2006.01)

(52) U.S. Cl.
CPC .......... *F16B 5/0048* (2013.01); *B65D 21/083* (2013.01); *E05D 1/06* (2013.01)

(58) Field of Classification Search
CPC ..... F16B 5/0048; B65D 21/083; B65D 11/18; E04F 13/0894; E04F 2201/023; E04F 2201/043; E04B 1/34384; E04B 1/34321; E04B 2103/04; E04H 1/1205; Y10T 403/7005
See application file for complete search history.

(56) References Cited

U.S. PATENT DOCUMENTS

| | | | | |
|---|---|---|---|---|
| 3,680,927 A * | 8/1972 | Neureuther | ............ | B65G 17/08 305/159 |
| 4,099,358 A * | 7/1978 | Compaan | ................ | F16B 5/008 52/588.1 |
| 4,196,555 A * | 4/1980 | Henges, Jr. | ............. | E04B 1/344 52/588.1 |
| 4,968,171 A * | 11/1990 | Shell | ................... | G09F 15/0068 403/387 |
| 5,228,579 A * | 7/1993 | Kaufman | .............. | A47F 5/0846 52/36.5 |
| 5,398,835 A * | 3/1995 | Blinstrub | ............... | B65D 19/18 220/7 |
| 11,313,135 B1 * | 4/2022 | Kenny | .................... | E04F 13/12 |
| 11,674,302 B2 * | 6/2023 | Skov | .................... | E04B 1/34384 52/79.1 |
| 2005/0180815 A1 * | 8/2005 | Gordon | ................ | F16B 7/0413 403/348 |
| 2006/0168855 A1 * | 8/2006 | D'Urban Jackson | ....................... | G09F 15/0068 40/584 |

* cited by examiner

*Primary Examiner* — Gisele D Ford
(74) *Attorney, Agent, or Firm* — Raymond Sun

(57) ABSTRACT

A system of panels is provided for use as panels for walls, doors and storage containers, where these panels can be quickly and conveniently assembled to build a variety of modular storage containers or other structures. The panels can include straight panels, L-panels, door end panels, door landing panels, and swivel hinge panels.

14 Claims, 23 Drawing Sheets

PANELS FOR WALLS, DOORS AND STORAGE CONTAINERS

BACKGROUND OF THE INVENTION

1. Field of the Invention

The present invention relates to a system of panels that can be used as panels for walls, doors and storage containers, and which can be used to quickly and conveniently build a variety of modular storage containers or other structures.

2. Description of the Prior Art

Portable structures are becoming more and more commonplace in today's world as there is a greater demand and need to provide structures and containers that can be fitted in certain locations or positions, or within designated spaces. There are numerous examples, but a couple of examples will highlight the wide applicability of these portable structures.

As one example, tool boxes and other storage containers are often mounted on the bed of a pickup truck. Since pickup trucks come in different shapes and sizes, and the desired usage requirements for these tool boxes can be quite varied, it is desirable for the owner of a pickup truck to be able to customize his or her desired tool box to his or her pickup truck and the desired needs/requirements.

As another example, storage sheds or temporary living shelters are used in different environments and locations for a variety of different purposes. Again, it would be desirable to be able to customize these sheds and shelters for use in meeting different demands or locations.

SUMMARY OF THE DISCLOSURE

The present invention provides a system of panels that can be used as panels for walls, doors and storage containers, where these panels can be quickly and conveniently assembled to build a variety of modular storage containers or other structures. The panels can include straight panels, L-panels, door end panels, door landing panels, and swivel hinge panels.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

The present invention provides a system of panels that can be used as panels for walls, doors and storage containers, where these panels can be quickly and conveniently assembled to build a variety of modular storage containers or other structures. The present invention will be described in connection with a tool box 10 (see FIG. 1) that is used in the bed of a pickup truck, and a panel cover assembly (see FIGS. 18-21), but these panels can be used to construct any modular container or shelter desired.

Figure 1:
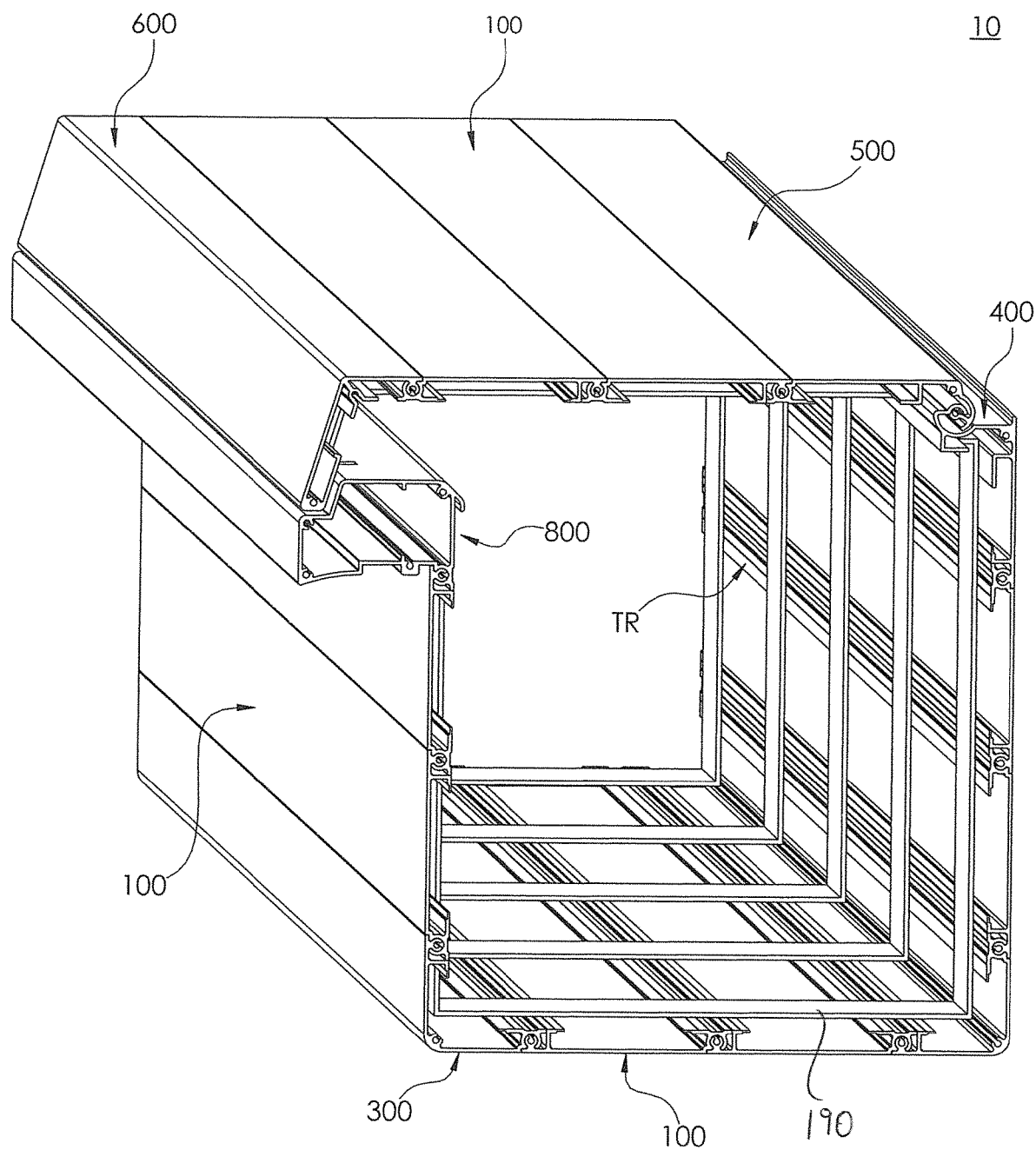
FIG. 1 is a perspective view of a cut-away section of a tool box that can be assembled using the panels of the present invention.
Figure 2:
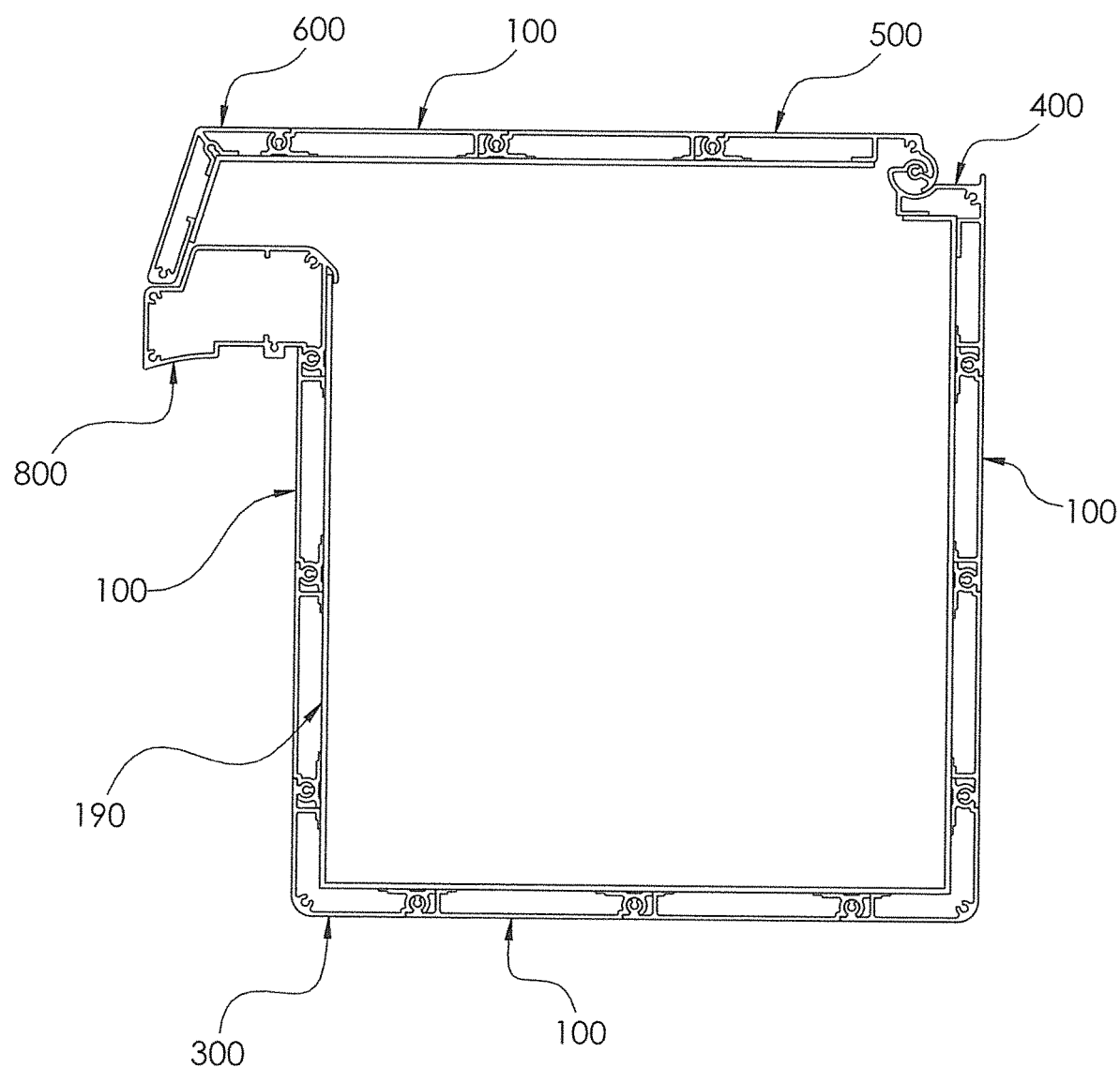
FIG. 2 is a cross-sectional side view of the tool box of FIG. 1 shown with the lid closed.
Figure 3:
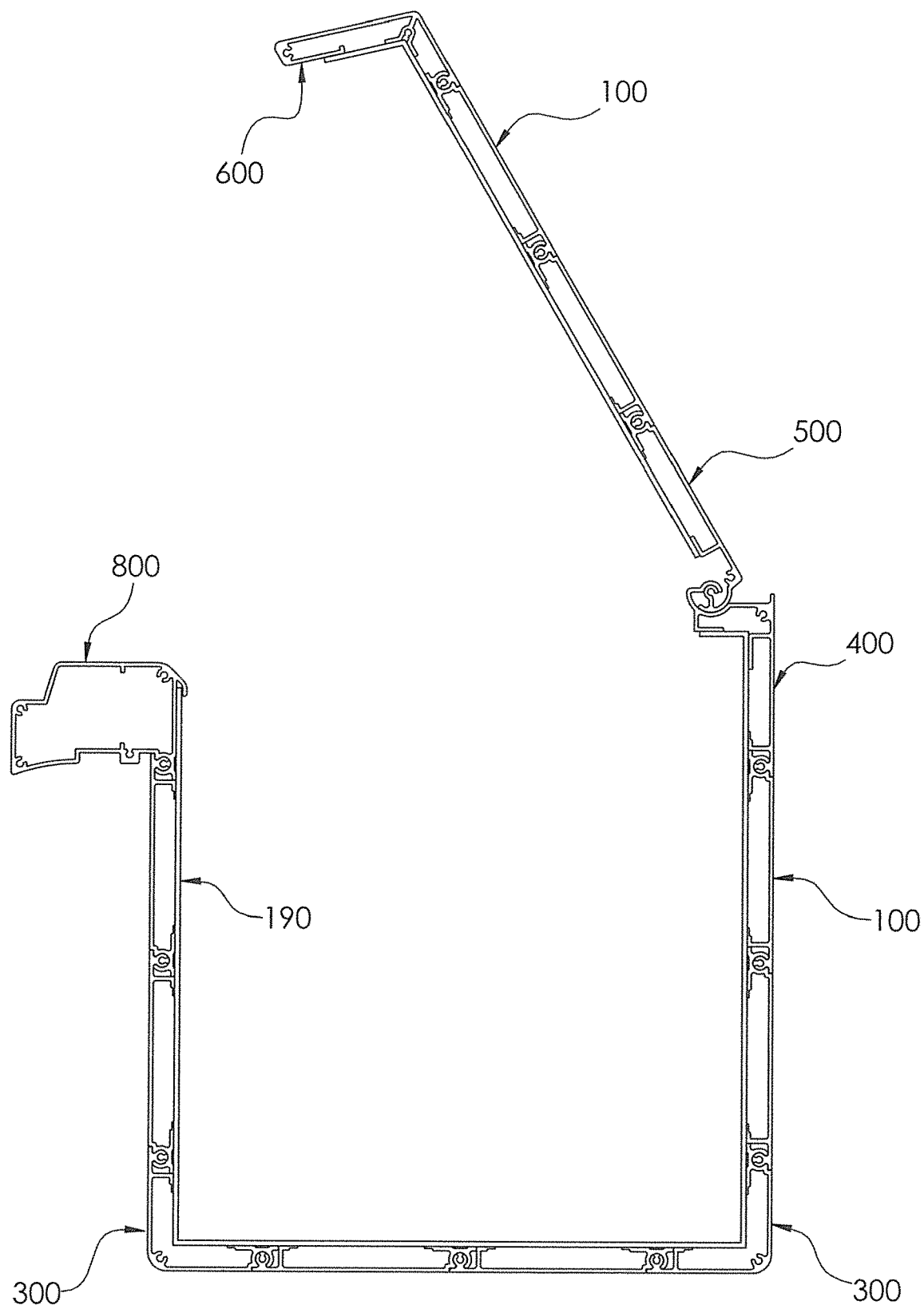
FIG. 3 is a cross-sectional side view of the tool box of FIG. 1 shown with the lid open.

FIGS. 1-3 illustrate a tool box 10 that is adapted to be installed on the bed of a pickup truck. The tool box 10 is a modular container that is constructed by attaching a plurality of different panels. These panels include straight panels 100 (see FIG. 6) and 500 (see FIG. 12), L-panels 300 (see FIG. 10) and 400 (see FIG. 11), door end panels 600 (see FIG. 13), and door landing panels 800 (see FIG. 15). A specific selection of different panels can be combined to create the tool box 10 shown in FIGS. 1-3. A different specific selection of panels can be combined to create the tool box 10a shown in FIGS. 4-5, thereby showing the versatility that this collection of panels can achieve in constructing objects with different shapes and sizes.

Each of the specific panels will now be described in connection with FIGS. 6-15.

Figure 6:
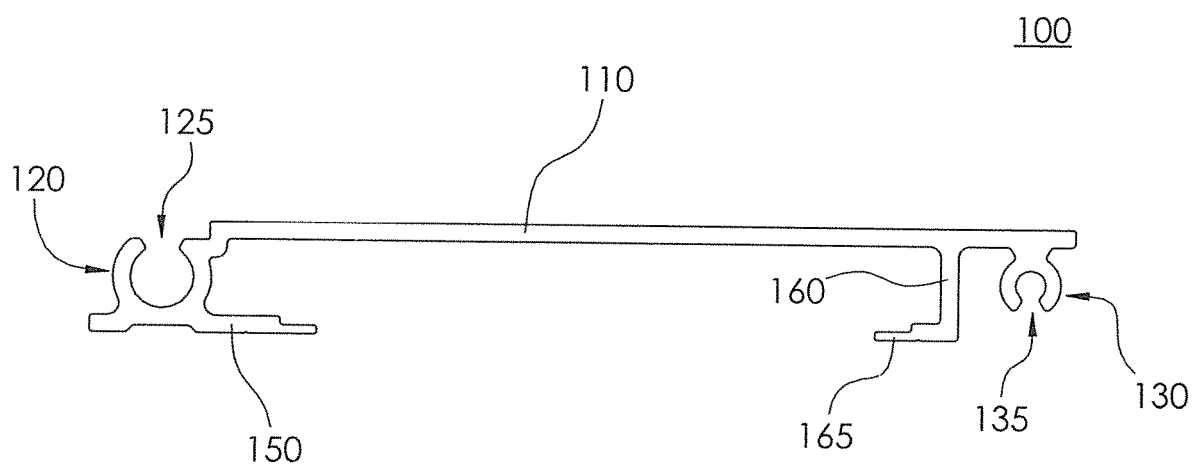
FIG. 6 is a cross-sectional view of a straight panel according to the present invention.
Figure 7:
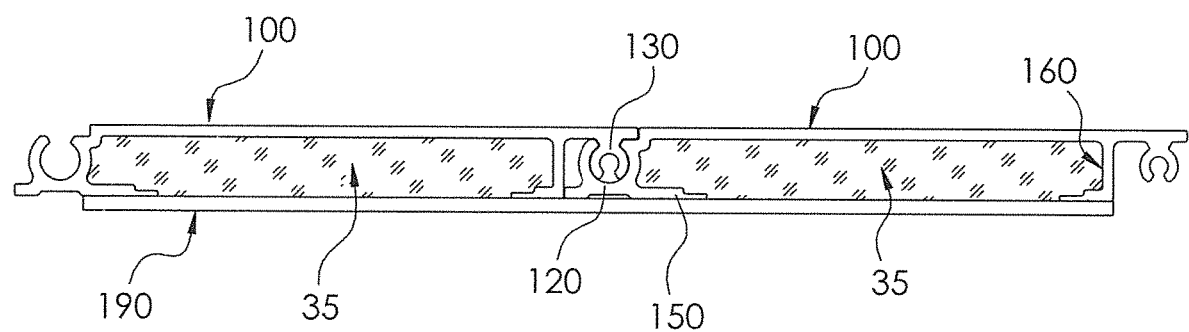
FIG. 7 is a cross-sectional view showing two straight panels of FIG. 6 connected to each other.
Figure 8:
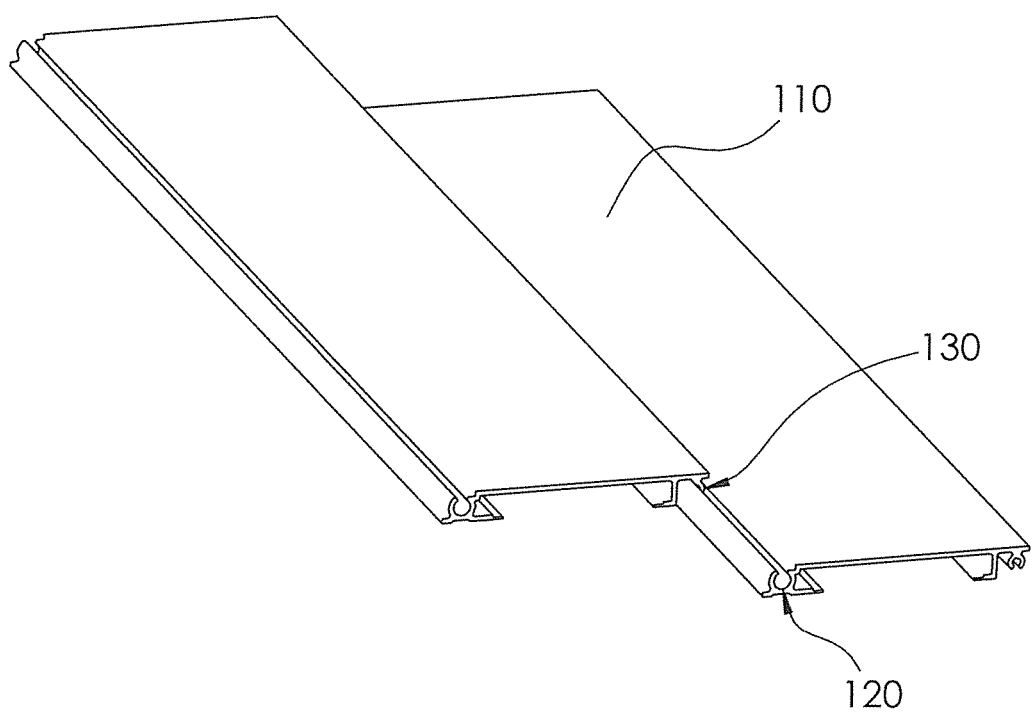
FIG. 8 is a perspective view showing two straight panels of FIG. 6 connected to each other.

FIGS. 6-8 illustrate a straight panel 100 according to the present invention. The panel 100 has a plate 110 having a female hinge connector 120 at one end, and a male hinge connector 130 at the other end. Each hinge connector 120 and 130 has a C-shaped structure, with the opening 125 and 135 of the respective C-shape being oriented, or facing, in opposite directions. The C-shape of the male hinge connector 130 (and the other male hinge connectors described below) can also serve as a screw port for receiving a connecting screw 60 (see FIG. 17). Also, the male hinge connector 130 is smaller than the female hinge connector 120, and is sized and configured to be snugly fitted into the female hinge connector 120 of another panel. The male hinge connector 130 functions as a screw or connection port when fitted inside another female connector. A foot 150 extends from the female hinge connector 120 towards the male hinge connector 130, and parallel with the plate 110. An L-shaped leg 160 extends from the bottom of the plate 110, with the bent foot 165 extending towards the female hinge connector 120, and parallel with the plate 110.

FIGS. 7 and 8 show how two straight panels 100 can be connected side-by-side to each other. The male hinge connector 130 of one panel 100 can be slid into the female hinge connector 120 of the other panel 100 to connect the two panels 100. As shown in FIG. 7, a support plate 190 can be mounted to the two panels 100 by securing the support plate 190 to the feet 150 and 165 of the panels 100, and insulation 35 (as an example) can be packed in the space between the plates 110 and 190.

Figure 9:
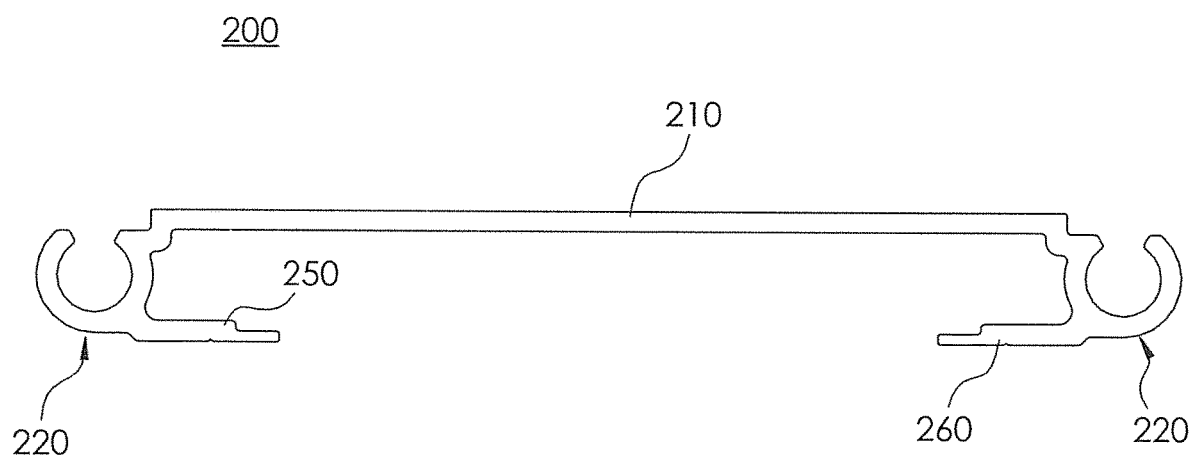
FIG. 9 is a cross-sectional view of another straight panel according to the present invention.

FIG. 9 is a cross-sectional view of another straight panel 200 according to the present invention. The panel 200 is the same as panel 100 except that it has two female hinge connectors 220 and no male hinge connector. A C-shaped female hinge connector 220 is provided at one end of a plate 210, and another C-shaped female hinge connector 220 is provided at the other end. The hinge connectors 220 can be the same as the hinge connector 120. Feet 250 and 260 extend towards each other from the two female hinge connectors 220, and parallel to the plate 210.

Figure 10:
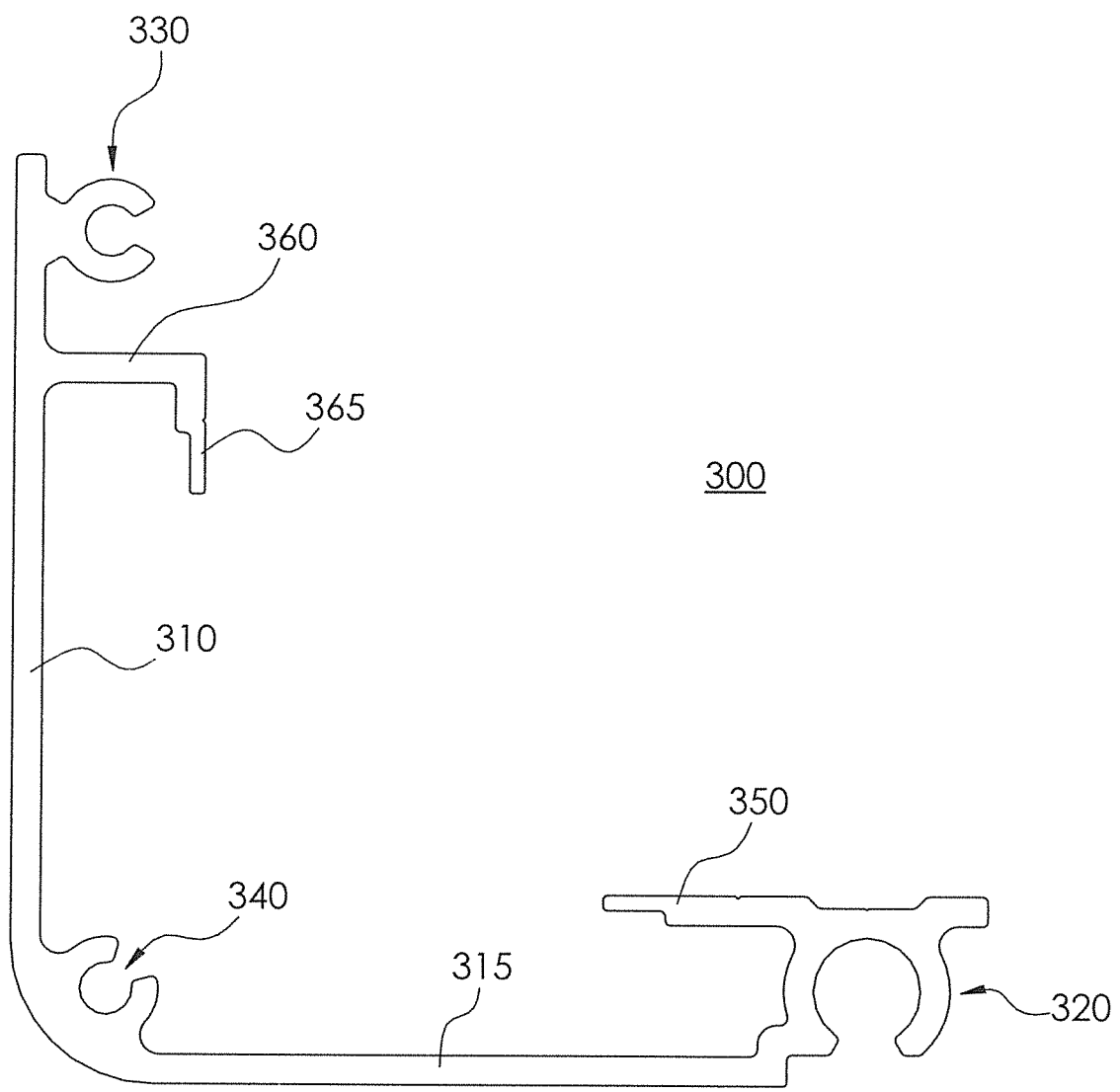
FIG. 10 is a cross-sectional view of an L-panel according to the present invention.

FIG. 10 is a cross-sectional view of an L-panel 300 according to the present invention. This L-panel 300 can be used to transition bends or corners in a container or object by connecting to adjacent straight panels 100. See FIG. 2. The L-panel 300 has an L-shaped plate which has two plate sections 310 and 315 that are perpendicular to each other. A female hinge connector 320 is provided at one end of the plate section 315, and a male hinge connector 330 at one end of the plate section 310 that is at the opposite end to the female hinge connector 320. The hinge connectors 320 and 330 can be the same as the hinge connectors 120 and 130, respectively, facing in opposite directions. A foot 350 extends from the female hinge connector 320 towards the plate section 310, and parallel with the plate section 315. An L-shaped leg 360 extends from the bottom of the plate section 310, with a bent foot 365 extending towards the plate section 315, and parallel with the plate section 310. A C-shaped screw support structure 340 can be provided at the corner where the plate sections 310 and 315 connect, so to receive a screw 60 that connects an end cover 55 to the L-panel 300. See FIG. 17.

As shown in FIG. 2, the female hinge connector 320 is adapted to be connected with a male hinge connector 130 of a straight panel 100, and the male hinge connector 330 is adapted to be connected with a female hinge connector 120 of a straight panel 100.

Figure 11:
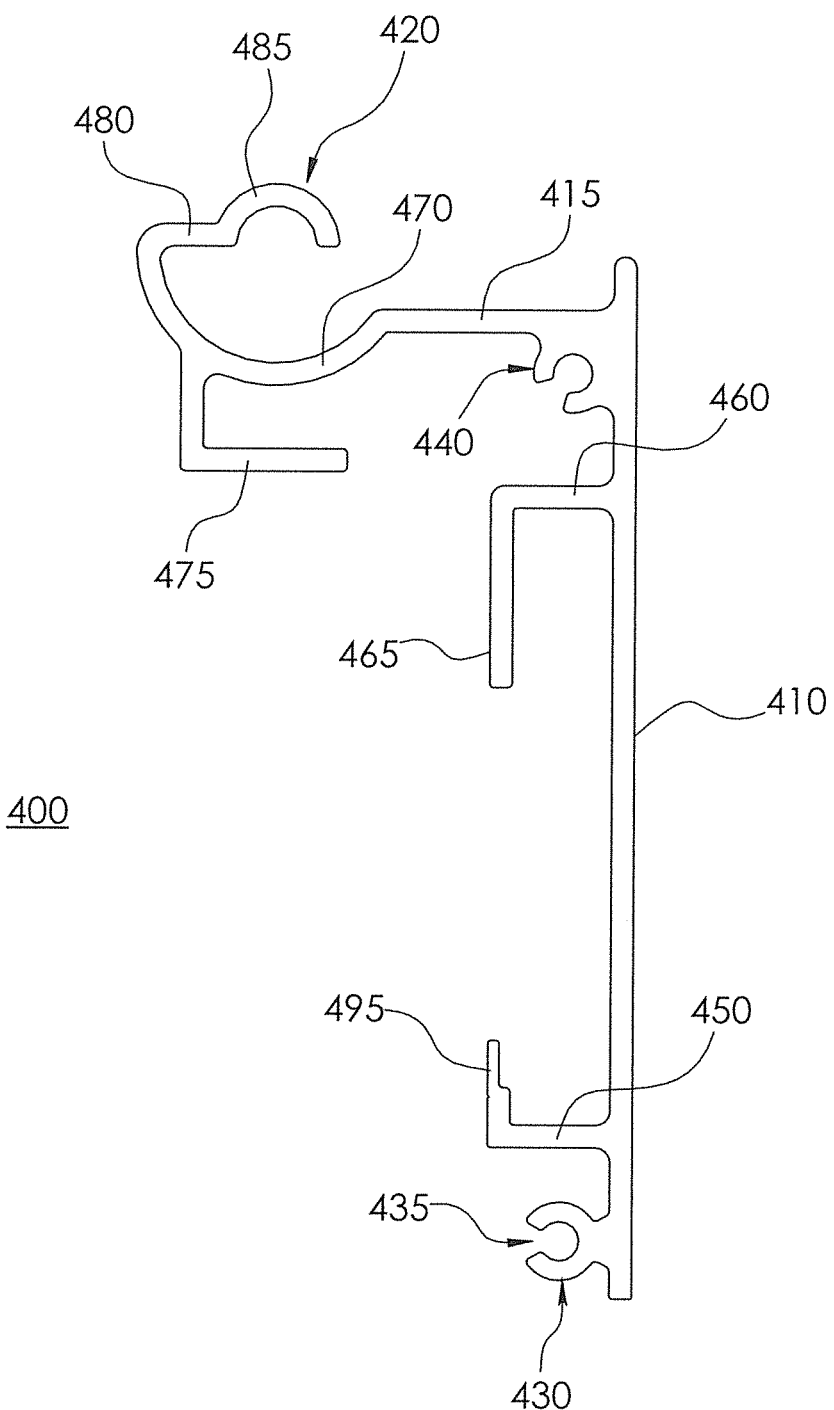
FIG. 11 is a cross-sectional view of a swivel-hinge L-panel according to the present invention.

FIG. 11 is a cross-sectional view of a swivel-hinge L-panel 400 according to the present invention. This L-panel 400 is one part of a swivel hinge, with the other part being the swivel-hinge panel 500 described below. The L-panel 400 has a plate 410 with a female swivel hinge connector 420 provided at one end of the plate 410, having a plate extension 415 extending in the same direction as the opening 435 of the C-shaped male hinge connector 430 that is provided at the opposite end of the plate 410. The plate extension 415 is a straight section, and transitions into the female swivel hinge connection 420 that has a curved C-portion 470 with a first end extending from the plate extension 415. An L-shaped leg 475 extends from the curved portion of the C-portion 470 towards the plate 410. A straight section 480 extends from the opposing second end of the C-portion 470, and terminates with a smaller C-portion 485 that is oriented opposite from the C-portion 470 so that the concavities of the two C-portions 470 and 485 face each other. An L-shaped leg 450 extends from the plate 410 adjacent the male hinge connector 430, with a bent foot 495 extending towards the female swivel hinge connector 420, and parallel with the plate 410. Another L-shaped leg 460 extends from the plate 410 adjacent the female swivel hinge connector 420, with a bent foot 465 extending towards the male hinge connector 430, and parallel with the plate 410. A C-shaped screw support structure 440 can be provided at the corner where the plate 410 and the plate extension 415 connect.

Figure 12:
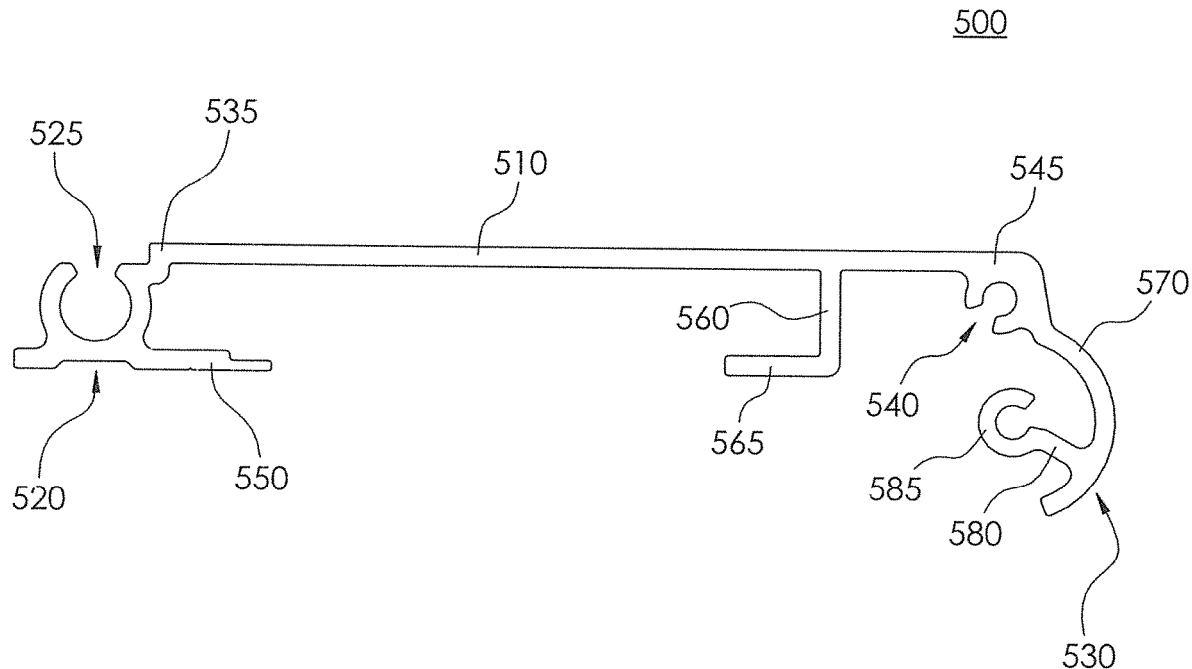
FIG. 12 is a cross-sectional view of a swivel-hinge straight panel according to the present invention.

FIG. 12 is a cross-sectional view of a swivel-hinge straight panel 500 which is the second part of a swivel hinge that can include the swivel-hinge L-panel 400. The panel 500 is similar to the straight panel 100 in that the panel 500 also has a plate 510 having a female hinge connector 520 at one end 535 with an opening 525, and also having a foot 550 that extends from the female hinge connector 520 towards the male swivel hinge connector 530 which is at the other end 545 of the plate 510. Similarly, an L-shaped leg 560 extends from the bottom of the plate 510 adjacent the other end 545, with a bent foot 565 extending towards the female hinge connector 520, and parallel with the plate 510. A C-shaped screw support structure 540 is provided at the other end 545 of the plate 510, so to receive a screw 60 that connects an end cover 55 to the panel 500. See FIG. 17. The male swivel hinge connector 530 extends from the end 545 and the screw support structure 540, and can be configured to have an arc 570, with a hook provided inside the concavity of the arc 570. The hook has a branch 580 and a C-shaped section 585, which can also serve as a screw port.

As shown in FIG. 2, the female swivel hinge connector 420 of the L-panel 400 is adapted to be connected with the male swivel hinge connector 530 of the panel in a manner where the C-shaped section 585 is received for rotation by the inner (concave) surface of the C-portion 485, while the outer surface of the arc 570 is adapted to be supported for rotation by the inner (concave) surface of the C-portion 470. The female hinge connector 520 is adapted to be connected with a male hinge connector 130 of a straight panel 100, and the male hinge connector 430 is adapted to be connected with a female hinge connector 120 of a straight panel 100.

Figure 13:
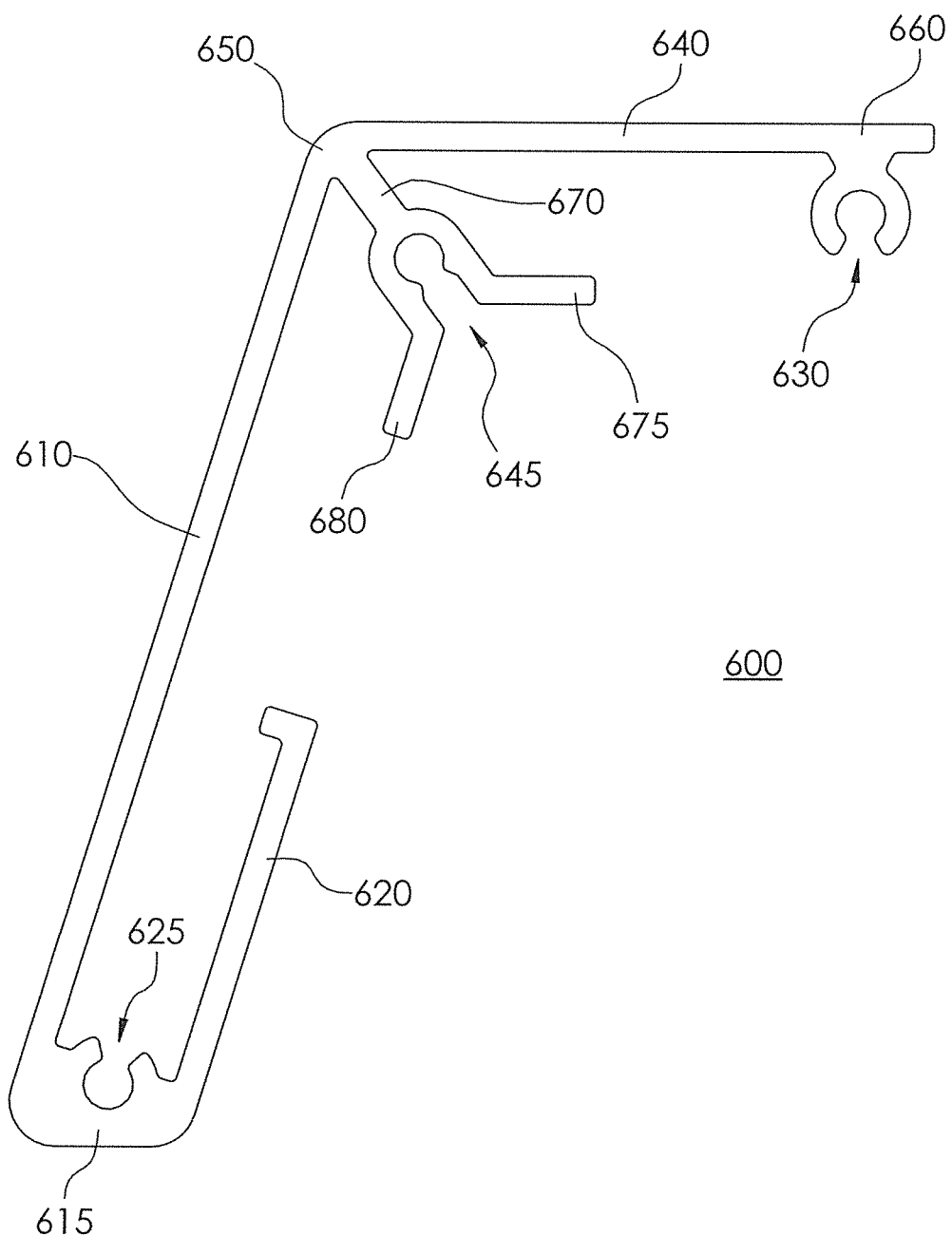
FIG. 13 is a cross-sectional view of a door end panel according to the present invention.

FIG. 13 is a cross-sectional view of a door end panel 600 which can function as the closing end of the lid for the tool box 10. The panel 600 has an inclined plate 610, with a bottom end of the inclined plate 610 transitioning about a corner 615 to a parallel inner plate or foot 620. A screw-support structure 625 is provided inside the corner 615. The top end of the inclined plate 610 transitions at a bend 650 to a horizontal plate 640. Another screw support structure 645 is provided at the inner side of the bend 650. A male hinge connector 630 is provided at the inside surface of the terminal end 660 of the horizontal plate 640. As shown in FIG. 2, the male hinge connector 630 is adapted to be connected with a female hinge connector 120 of a straight panel 100. The screw support structure 645 can include a branch 670 and two feet 675 and 680 extending from the branch 670, with the feet 675 and 680 oriented parallel to the plates 640 and 610, respectively.

Figure 15:
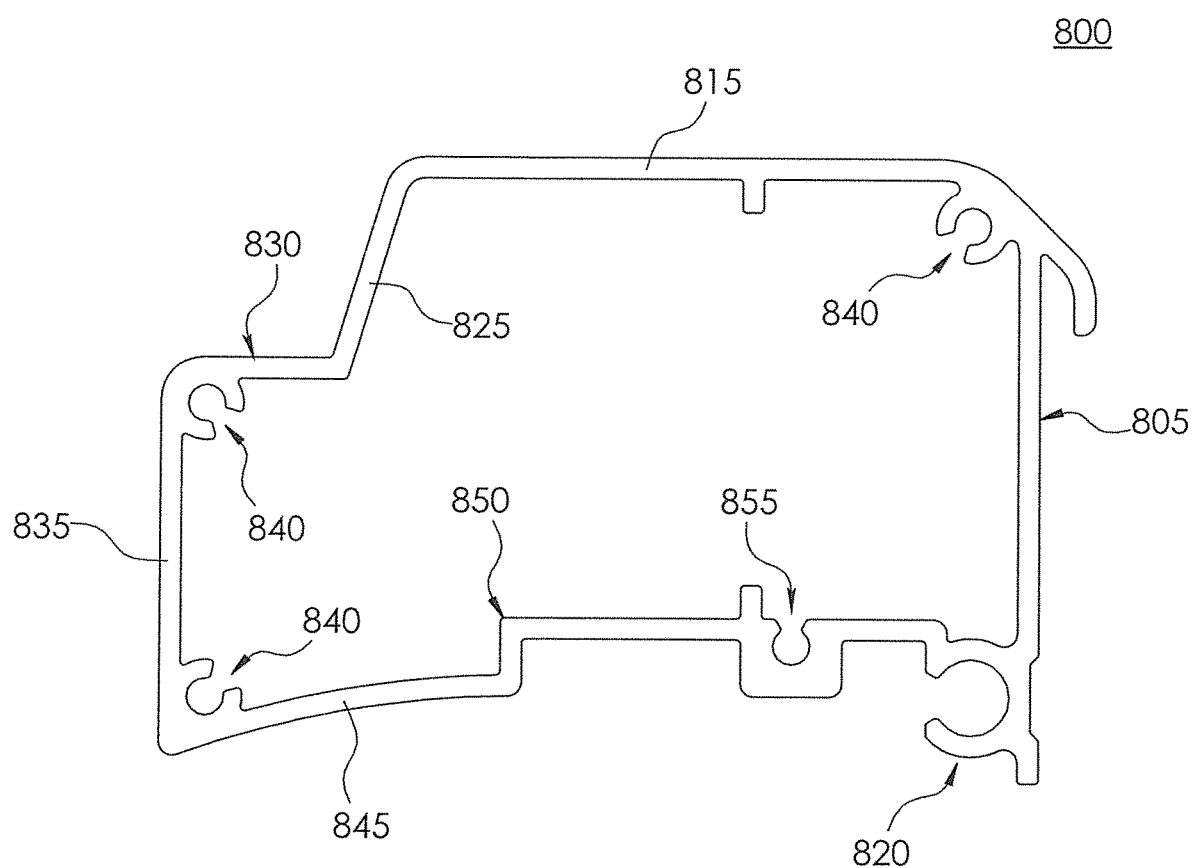
FIG. 15 is a cross-sectional view of a door landing panel according to the present invention.

FIG. 15 is a cross-sectional view of a door landing panel 800 according to the present invention. The door landing panel 800 has a vertical wall 805 having a female hinge connector 820 at its bottom end. A top plate 815 extends from the top end of the vertical wall 805, and transitions into an angled wall 825 that ends at a ledge 830. Another vertical wall 835 (which is parallel to the vertical wall 805) extends downwardly from the front end of the ledge 830. The bottom end of the vertical wall 835 transitions into a bottom plate 845. The bottom plate 845 is generally parallel to the ledge 830 and top plate 815, but also has a step 850 which separates the bottom plate 845 into two sections. C-shaped screw support structures 840 are provided at the corners between the vertical wall 805 and the top plate 815, between the ledge 830 and the vertical wall 835, and between the vertical wall 835 and the bottom plate 845, so to receive a screw 60 that connects an end cover 55 to the door landing panel 800. See FIG. 17. Another screw port 855 can be provided in the bottom plate 845.

As shown in FIG. 2, the door landing panel 800 can be connected to a straight panel 100 that is oriented in a vertical orientation as a front wall of the tool box 10 by engaging a male hinge connector 130 of the straight panel 100 into the female hinge connector 820. The door end panel 600 functions as the lid or door for the tool box 10, and the bottom end 615 is adapted to rest on the ledge 830 of the door landing panel 800.

Referring to FIG. 2, the tool box 10 is assembled as follows. Two L-panels 300 are used to define the two bottom corners of the tool box 10. Any number of straight panels 100 can be provided between the two L-panels 300 to define the bottom wall for the tool box 10, although FIG. 2 shows two straight panels 100. The door landing panel 800 is provided at the top of the front wall of the tool box 10, which is defined by two straight panels 100 between the front L-panel 300 and the door landing panel 800. The swivel hinge which is comprised of the swivel-hinge straight panel 500 and the swivel-hinge L-panel 400 is provided at the top of the rear wall of the tool box 10. The rear wall can be defined by three straight panels 100 between the rear L-panel 300 and the swivel-hinge L-panel 400. The top wall can be defined by two straight panels 100 between the swivel-hinge straight panel 500 and the door end panel 600. Support plates 190 can be attached to the feet of the panels, such as the feet 150 and 160 of the straight panels 100, do define internal walls. FIG. 3 shows the tool box 10 with the lid (i.e., the door end panel 600) opened.

Figure 4:
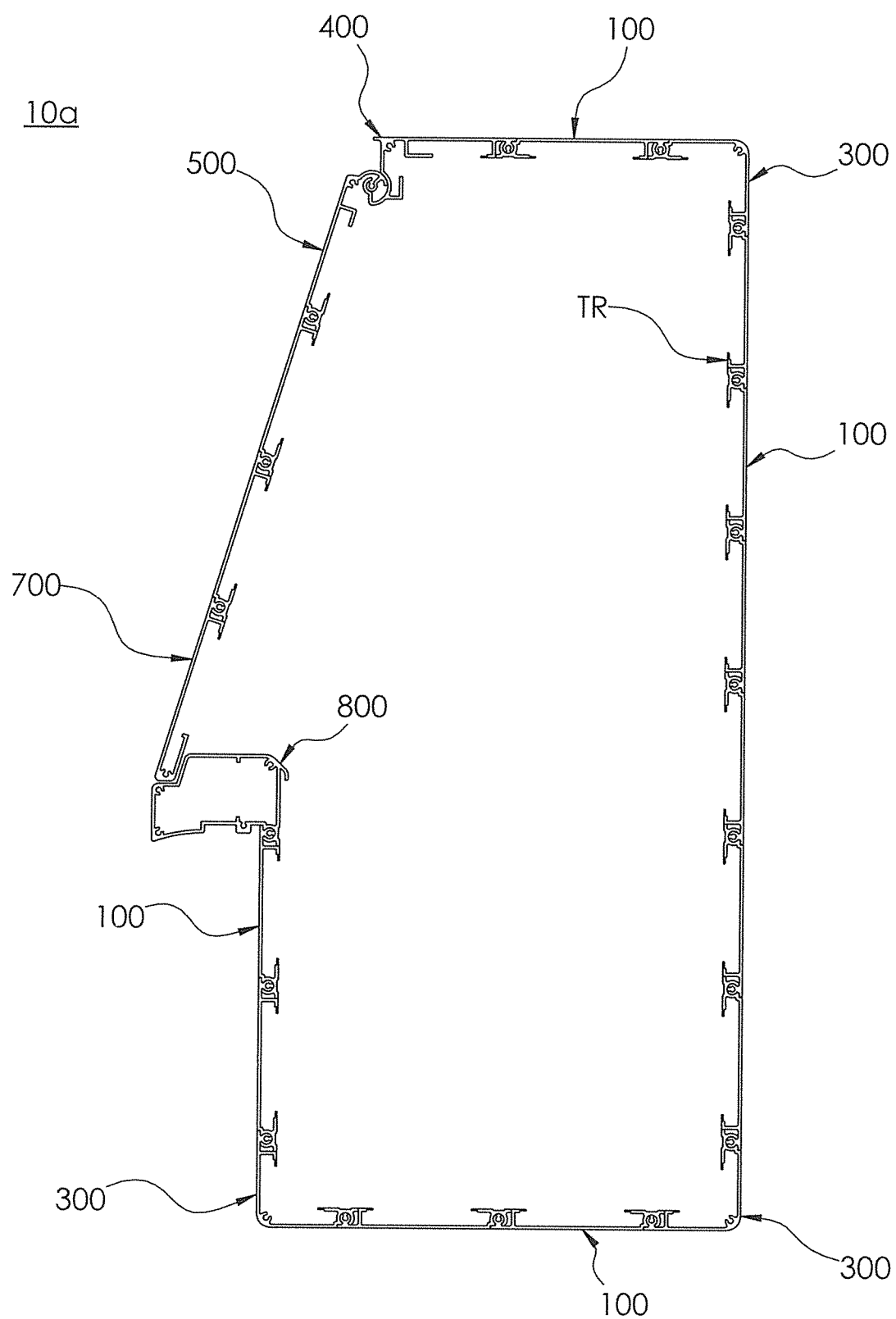
FIG. 4 is a cross-sectional side view of a modified version of the tool box of FIG. 1 shown with the lid closed.
Figure 5:
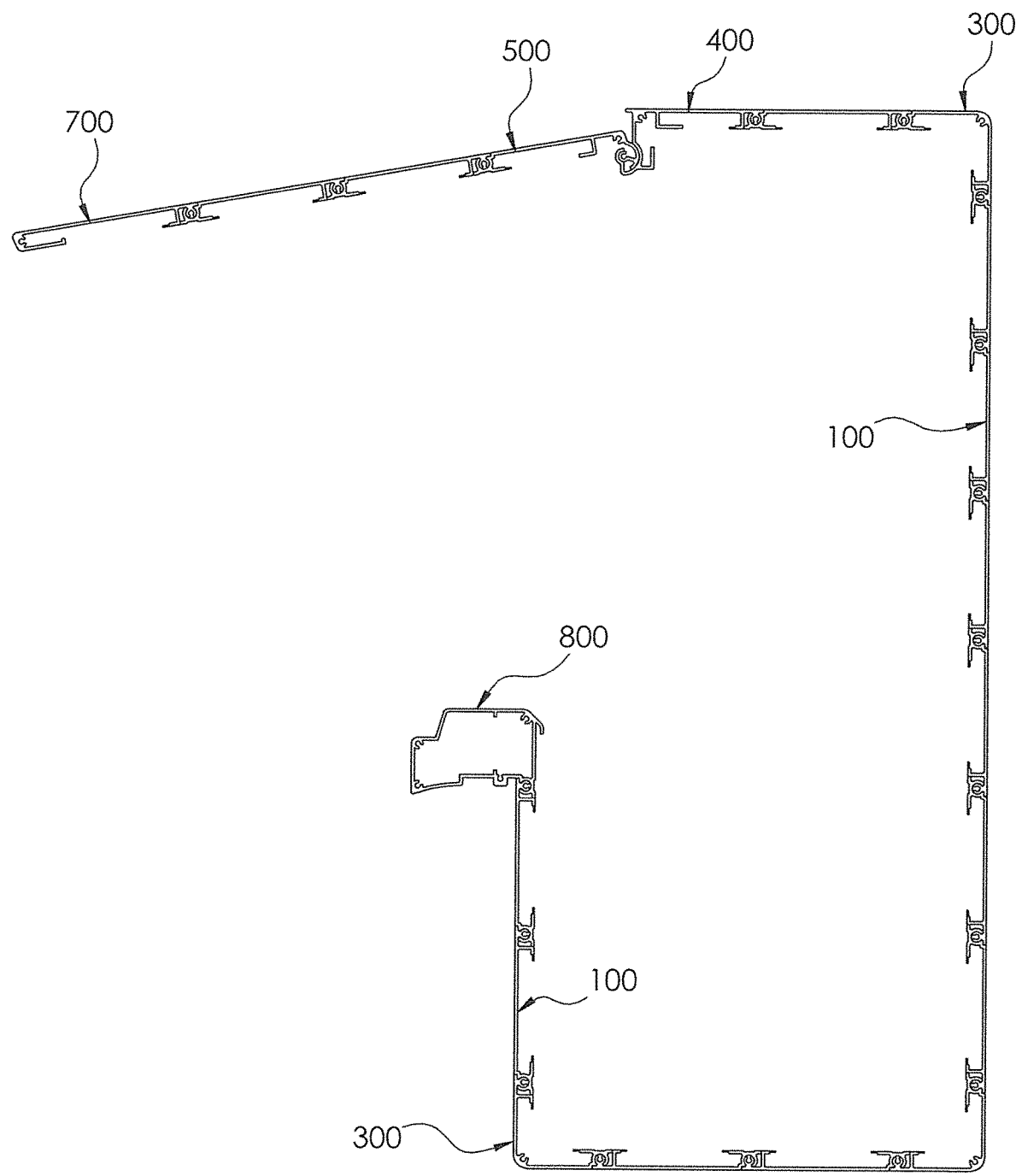
FIG. 5 is a cross-sectional side view of a modified version of the tool box of FIG. 1 shown with the lid open.

Although the tool box 10 is illustrated using specific numbers of straight panels 100, the number of straight panels 100 along each of the walls or sides can be varied. For example, FIGS. 4-5 illustrate another tool box 10a having the same construction as the tool box 10 in FIGS. 2-3, except that the vertical front and rear walls are higher because additional straight panels 100 have been added. The other difference is that the swivel hinge which is comprised of the swivel-hinge straight panel 500 and the swivel-hinge L-panel 400 is now provided at the front (instead of the rear), with a simple L-panel 300 provided to transition the straight panels 100 at the rear wall and the top wall. The lid is comprised of two straight panels 100 with the swivel-hinge straight panel 500 at the top end, and a door end panel 700 at the bottom end that abuts the ledge 830 of the door landing panel 800.

Figure 14:
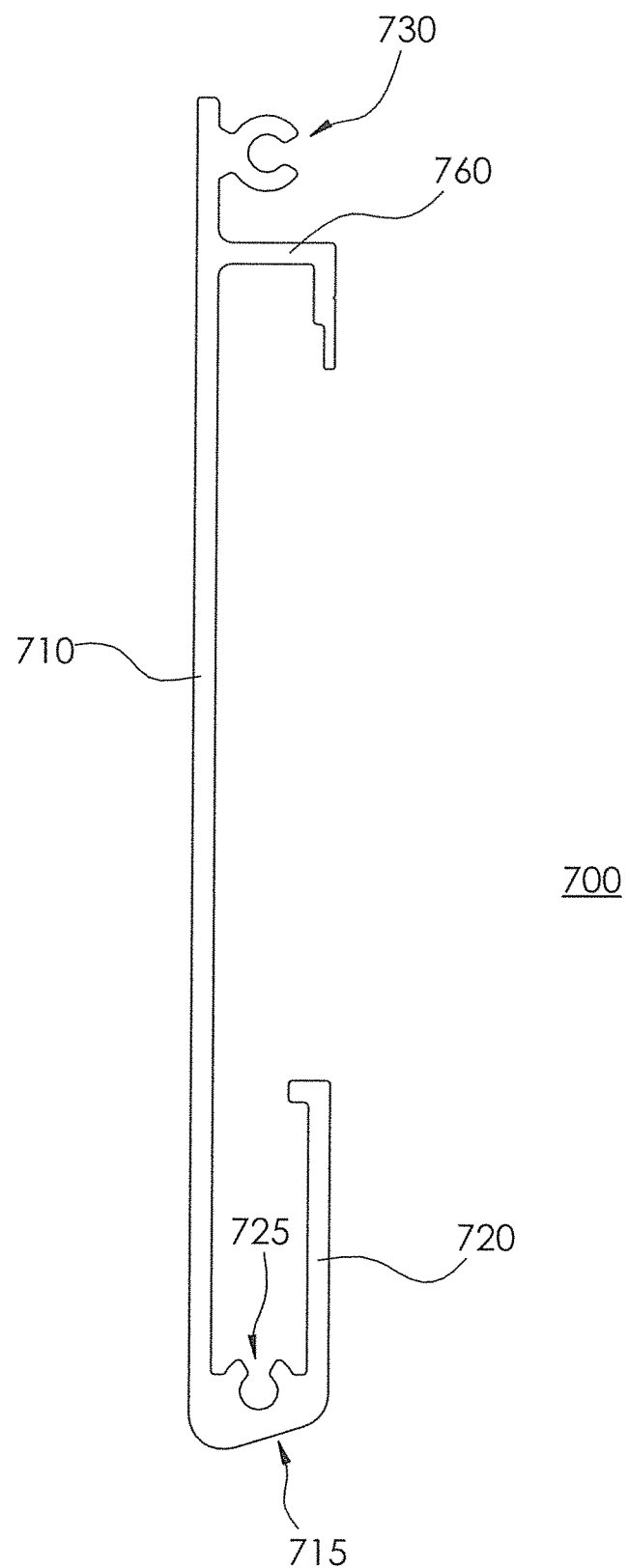
FIG. 14 is a cross-sectional view of another door end panel according to the present invention.

FIG. 14 is a cross-sectional view of the door end panel 700 that can be used with the tool box 10a in FIGS. 3-4. The panel 700 has a plate 710, with a bottom end of the plate 710 transitioning about a corner 715 to a parallel inner plate or foot 720. A screw-support structure 725 is provided inside the corner 715. The top end of the plate 710 is provided with a male hinge connector 730 along its inside surface. An L-shaped leg 760 is provided adjacent the male hinge connector 730. As shown in FIG. 4, the male hinge connector 730 is adapted to be connected with a female hinge connector 120 of a straight panel 100.

Figure 16:
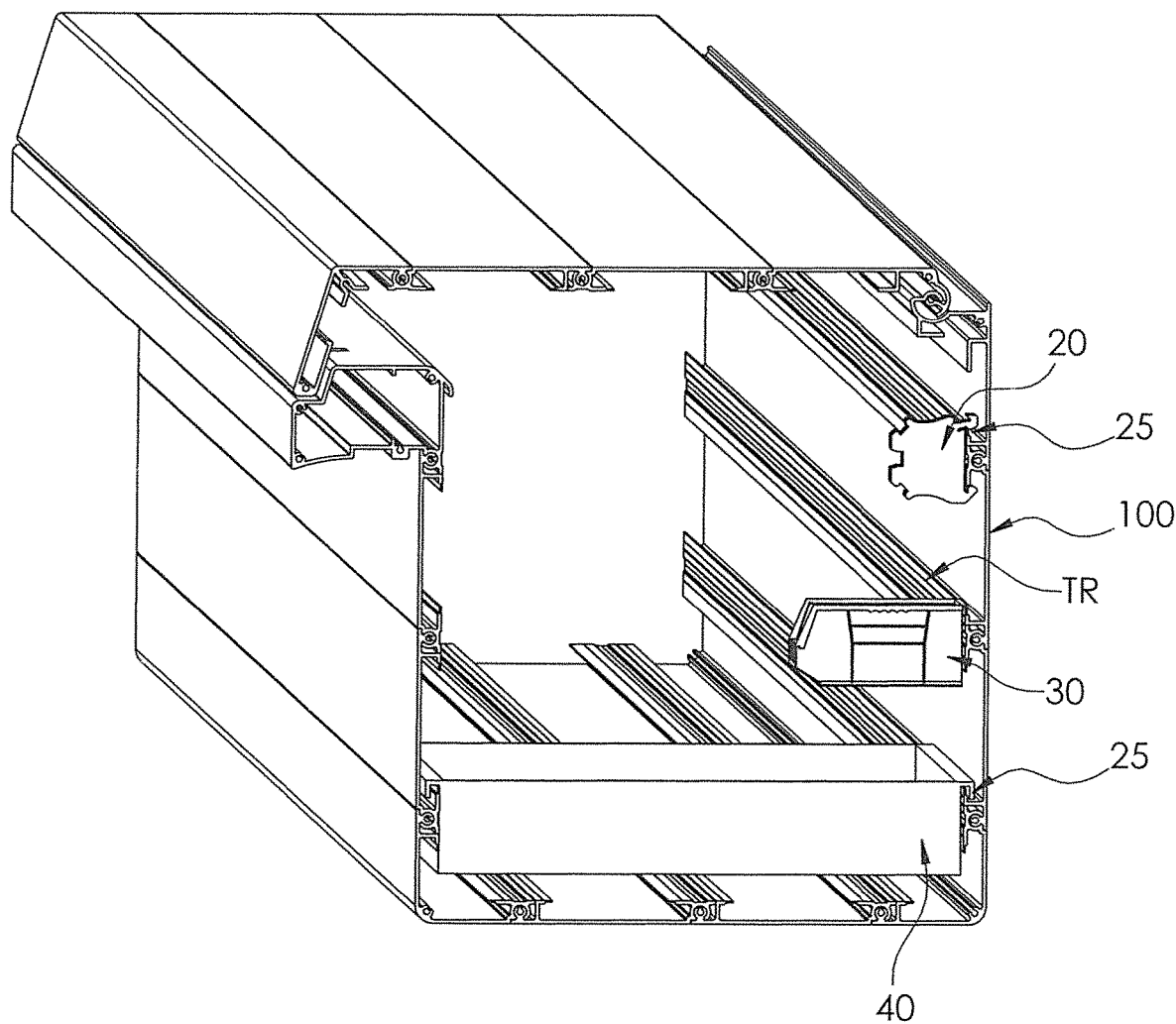
FIG. 16 illustrates the interior of the tool box of FIG. 1 being used to hold or support a terminal block, a bin and a tray.

FIG. 16 illustrates the interior of the tool box 10 of FIG. 1 being used to hold or support a din rail terminal block 20, a bin 30, and a tray 40, which are all conventional components found in tool boxes. In the tool box 10 in FIG. 16, the support plates 190 are removed to expose the feet (e.g., 150 and 165 for a straight panel 100) of the respective panels. As best shown in FIGS. 1, 4 and 16, the feet 150 and 165 from adjacent straight panels 100 form a T-shaped track TR. Similar tracks can be formed by the pairs of feet 150 and 365, and 165 and 350, between the panels 100 and 300. Similar tracks can be formed by the pairs of feet 150 and 495 between the panels 100 and 400, the pairs of feet 165 and 550 between the panels 100 and 500, and the pairs of feet 150 and 760 between the panels 100 and 700. These tracks TR allow the terminal block 20, bin 30, and tray 40 (as well as other components) to be carried on the tracks TR to be organized and supported in the tool box 10. The terminal block 20, bin 30, and tray 40 can have corresponding rails 25 that are adapted to travel along the tracks TR. As shown in FIG. 1, support plates 190 can be attached to certain sections of the interior of the tool box 10 to allow certain feet of certain panels to be exposed.

Figure 17:
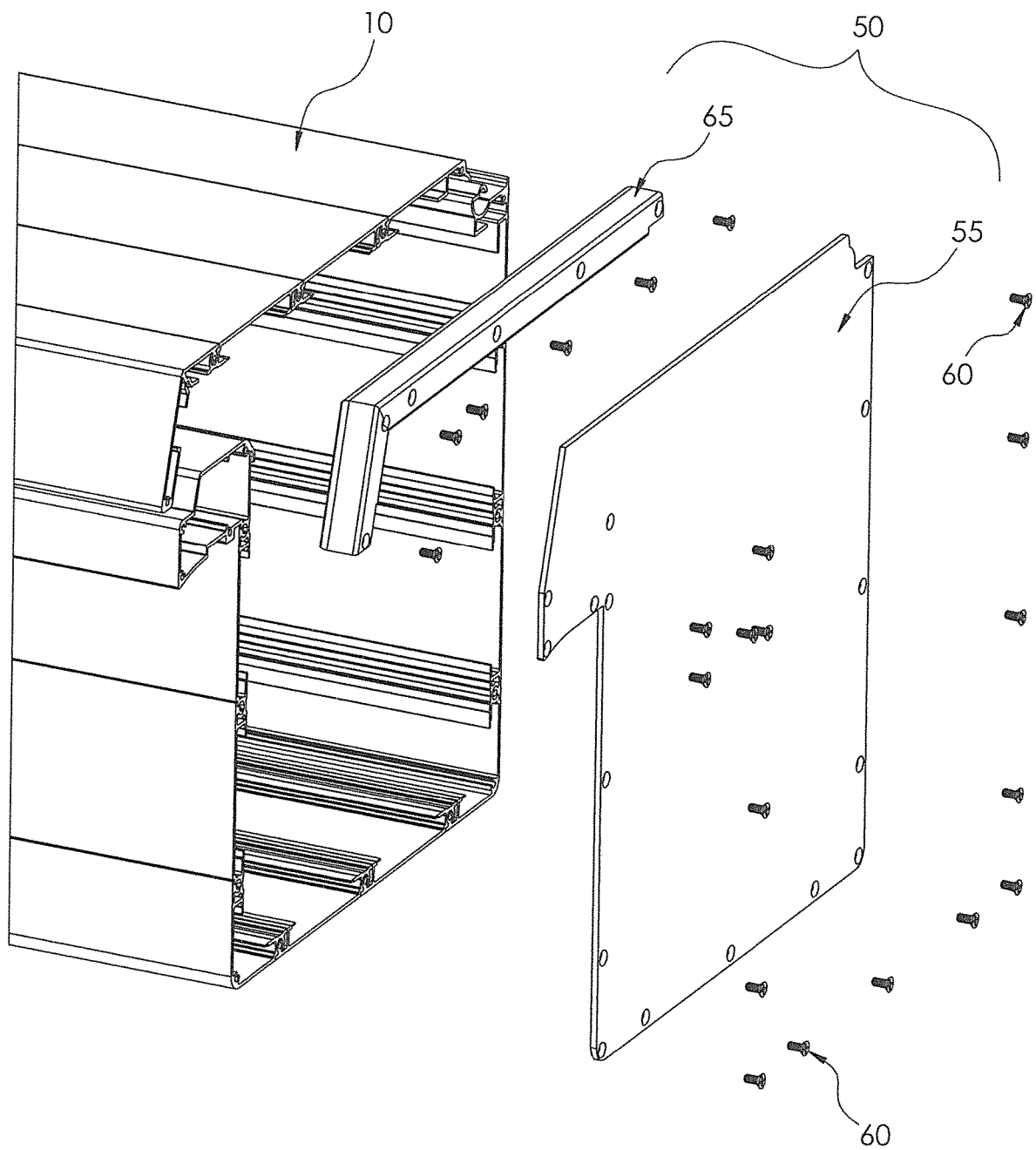
FIG. 17 is an exploded perspective view of the tool box of FIG. 1 showing the connection of an end cover.

FIG. 17 illustrates a panel cover assembly 50 for use in covering the two ends of the tool box 10 in FIGS. 1-3. The panel cover assembly 50 has an end cover 55 that is connected to the panels via screws 60 at the locations of the various screw support structures and screw ports described (e.g., 130, 330, 340, 430, 440, 840, and 855). A door end cover 65 can be used to interface the end cover 55 and the ends of the door or lid. The door or lid would normally comprise the panels 100, 500 and 600 in FIGS. 1-3, or the panels 100, 400, 500 and 700 in FIGS. 4-5, so the door end cover 65 would have to be sized and configured to align with the size and configuration of the door or lid being used for the specific toolbox. For the door or lid that is comprised of the panels 100, 500, 600, the end cover 65 can be mounted to screw support structures or screw ports 130, 585, 625, 630 and 645.

Figure 22:
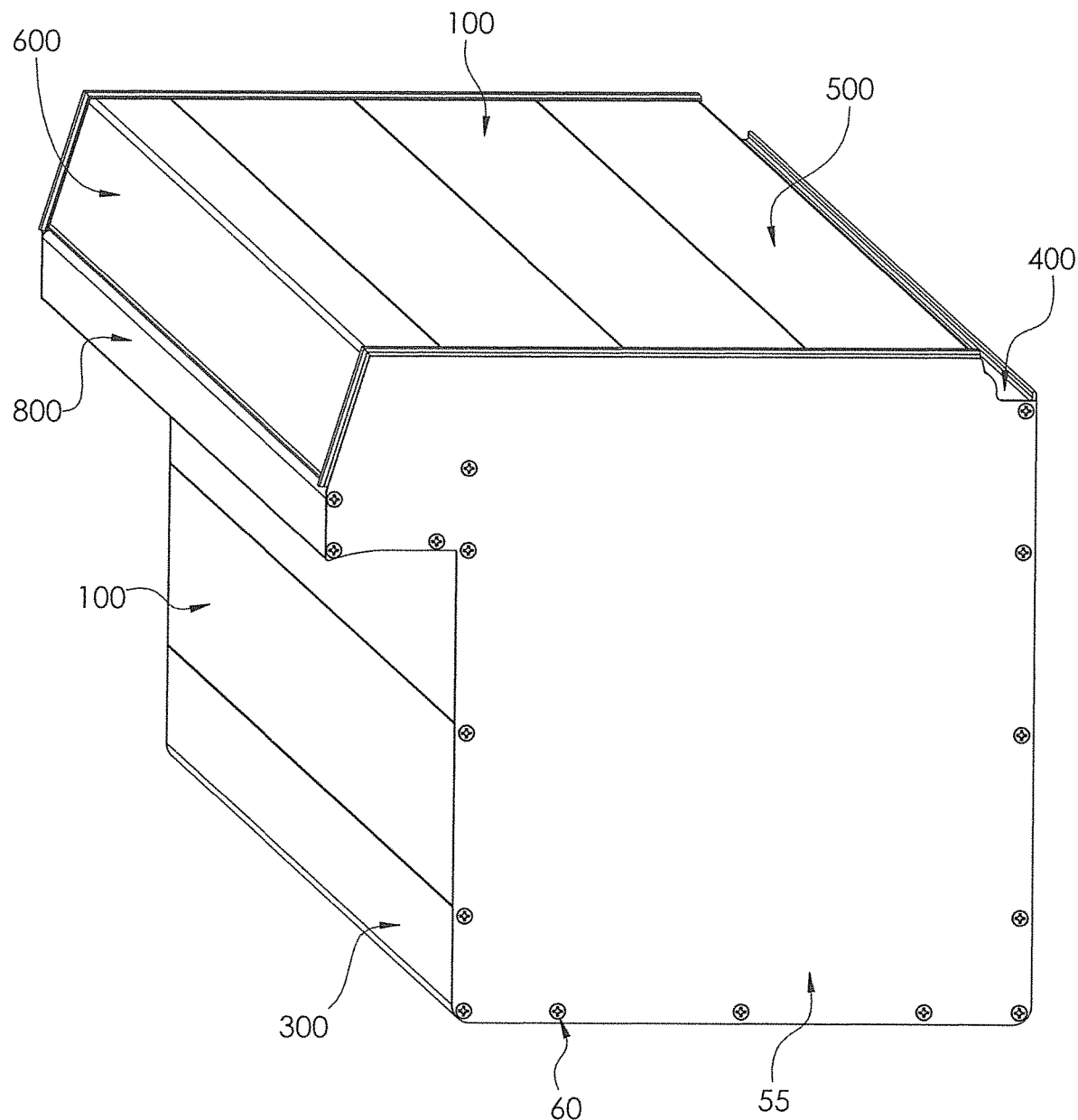
FIG. 22 is a perspective view of the fully-assembled tool box of FIG. 1 with the lid closed.
Figure 23:
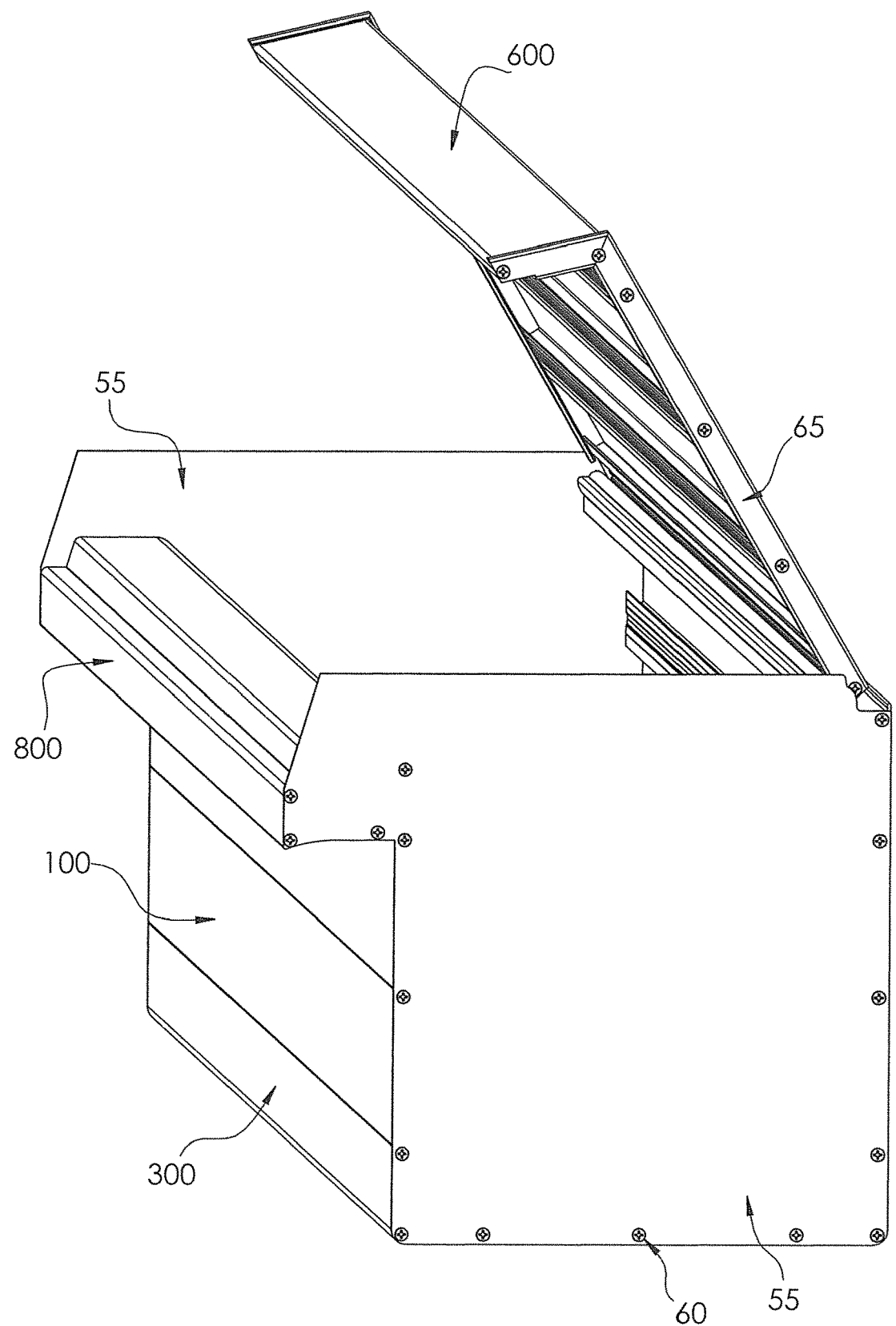
FIG. 23 is a perspective view of the fully-assembled tool box of FIG. 1 with the lid opened.

FIGS. 22 and 23 show the complete tool box 10 after assembly.

Figure 18:
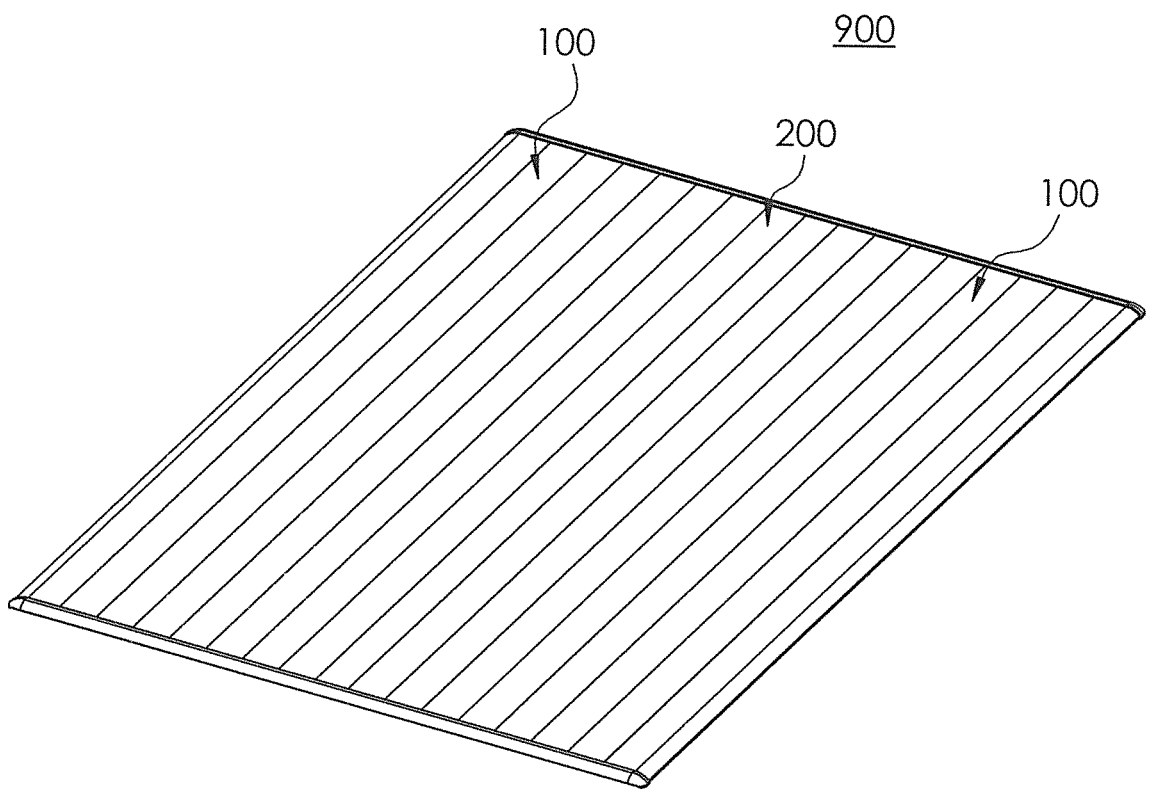
FIG. 18 is a perspective view of a panel cover assembly according to the present invention.
Figure 19:
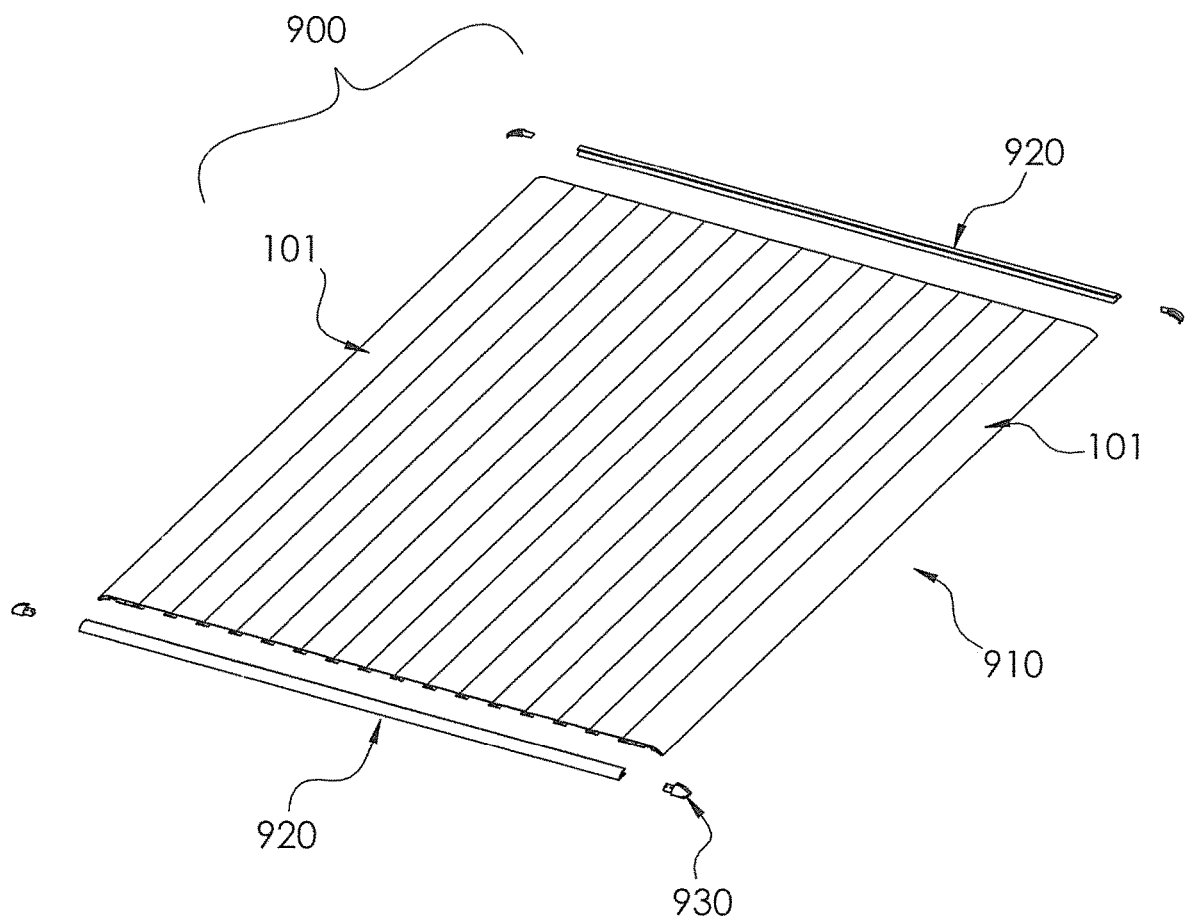
FIG. 19 is an exploded perspective view of the panel cover assembly of FIG. 18.
Figure 20:
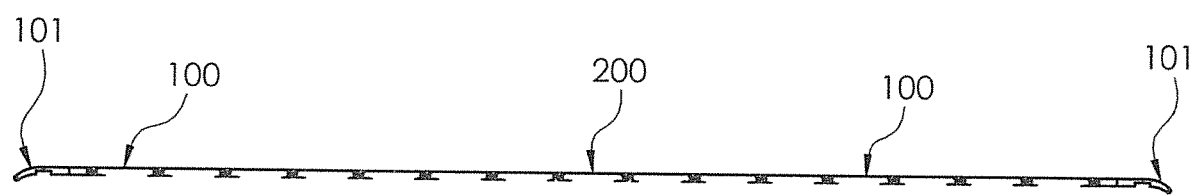
FIG. 20 is a sectional side view of the panel cover assembly of FIG. 18.
Figure 21:
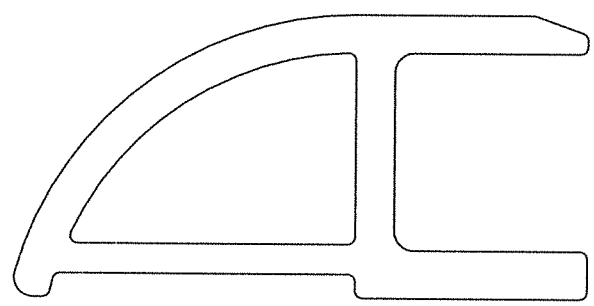
FIG. 21 is a sectional side view of a cover end cap for use with the panel cover assembly of FIG. 18.

FIGS. 18-20 illustrate a panel cover assembly 900 according to the present invention. This panel cover assembly 900 can be used to cover the open top of the bed of a pick-up truck, and can be assembled using panels described hereinabove. The panel cover assembly 900 has a cover section 910 that is made by connecting a plurality of straight panels 100 in a side-by-side manner, with the two opposing end panels 101 having the same construction and curved configuration. In addition, the panel 200 in FIG. 9 can be used to mirror straight panels 100 from one another. Curved end supports 920 are provided to clip and secure the other two opposing ends. Cover end caps 930 (see FIG. 21) are provided to close the opposite ends of the end supports 920.

Thus, the various panels provided by the present invention allow for the construction of a wide variety of objects, structures and shelters.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. An object, comprising a plurality of panels, wherein:
the plurality of panels includes at least two straight panels, with each straight panel comprising:
a plate having a first end and a second end;
a female hinge connector provided at the first end;
a male hinge connector provided at the second end, the male hinge connector being smaller than the female hinge connector, and sized and configured to be snugly fitted into the female hinge connector of another straight panel;
wherein the female hinge connector has a connector foot which extends from the female hinge connector towards the male hinge connector, and is parallel with the plate;
wherein an L-shaped leg extends from the plate and has a bent foot which extends towards the female hinge connector and is parallel with the plate; and
wherein first and second straight panels are connected side-by-side to each other when the male hinge connector of the first straight panel is slid into the female hinge connector of the second straight panel; and
wherein a support plate is mounted to the first and second straight panels by securing the support plate to the connector feet of the first and second panels.

2. The object of claim 1, wherein a space is defined between the support plate and the plates of the first and second panels, and insulation is provided inside the space.

3. The object of claim 1, wherein each female hinge connector has a C-shaped structure with an opening.

4. The object of claim 3, wherein the plate has a first surface and a second surface, and each male hinge connector has a C-shaped structure with an opening, wherein the opening for the female hinge connector faces away from the first surface, and the opening for the male hinge connector faces away from the second surface.

5. An object, comprising at least one straight panel and at least one an L-panel, wherein:
each straight panel comprises:
a plate having a first end and a second end;
a female hinge connector provided at the first end;
a male hinge connector provided at the second end, the male hinge connector being smaller than the female hinge connector, and sized and configured to be snugly fitted into the female hinge connector of another straight panel;
wherein the female hinge connector has a connector foot which extends from the female hinge connector towards the male hinge connector, and is parallel with the plate;
wherein an L-shaped leg extends from the plate and has a bent foot which extends towards the female hinge connector and is parallel with the plate;
each L-panel comprises:
an L-shaped plate which has a first plate section and a second plate section that are perpendicular to each other;
a female hinge connector provided at one end of the first plate section;
a male hinge connector provided at one end of the second plate section opposite the first plate section;
a connector foot extending from the female hinge connector towards the second plate section, and parallel with the first plate section;
an L-shaped leg extending from the second plate section and having a bent foot extending towards the first plate section, and parallel with the second plate section; and
wherein the female hinge connector of an L-panel is connected with a male hinge connector of a straight panel, and the male hinge connector of the same L-panel is connected with a female hinge connector of a different straight panel.

6. The object of claim 1, wherein a C-shaped screw support structure is provided at a corner where the first and second plate sections connect.

7. The object of claim 5, wherein each female hinge connector of the straight panels and L-panels has a C-shaped screw structure with an opening.

8. The object of claim 7, wherein each male hinge connector of the straight panels and the L-panels has a C-shaped screw structure with an opening.

9. An object, comprising a plurality of panels that include:
a swivel-hinge straight panel having:
a first plate having first and second ends;
a male swivel hinge connector provided at the first end;
a female hinge connector provided at the second end, and having a foot that extends from the female hinge connector towards the male swivel hinge connector;
an L-shaped leg extending from the first plate adjacent the first end, and having a bent foot extending towards the female hinge connector, and parallel with the first plate;
a swivel hinge L-panel having:
a second plate having first and second ends;
a female swivel hinge connector provided at the first end of the second plate;
a male hinge connector provided at the second end of the second plate;
an L-shaped leg extending from the second plate and having a bent foot extending parallel with the second plate; and
wherein the male swivel hinge connector is pivotably connected to the female swivel hinge connector.

10. The object of claim 9, wherein a C-shaped screw support structure is provided at the first end of the first plate.

11. The object of claim 9, wherein the male swivel hinge connector is configured to have an arc having a concavity, with a hook provided inside the concavity.

12. The object of claim 11, wherein the hook has a branch and a C-shaped section.

13. The object of claim 9, wherein the female swivel hinge connector has a plate extension extending from the second end of the second plate, with the plate extension transitioning into a curved C-portion with having a first end and a second end extending from the plate extension, and wherein an L-shaped leg extends from the curved C-portion towards the second plate, and wherein a hook extends from the second end of the curved C-portion.

14. The object of claim 13, wherein a C-shaped screw support structure is provided at a corner where the second plate and the plate extension meet.

* * * * *